US012530588B2

(12) United States Patent
Du et al.

(10) Patent No.: US 12,530,588 B2
(45) Date of Patent: Jan. 20, 2026

(54) GENERATIVE VIDEO COMPRESSION WITH A TRANSFORMER-BASED DISCRIMINATOR

(71) Applicants: SANTA CLARA UNIVERSITY, Santa Clara, CA (US); KWAI INC., Palo Alto, CA (US)

(72) Inventors: Pengli Du, Santa Clara, CA (US); Ying Liu, Santa Clara, CA (US); Nam Ling, Santa Clara, CA (US); Yongxiong Ren, San Jose, CA (US); Lingzhi Liu, San Jose, CA (US)

(73) Assignees: Beijing Dajia Internet Information Technology Co., Ltd., Beijing (CN); Santa Clara University, Santa Clara, CA (US)

( * ) Notice: Subject to any disclaimer, the term of this patent is extended or adjusted under 35 U.S.C. 154(b) by 663 days.

(21) Appl. No.: 17/971,546

(22) Filed: Oct. 21, 2022

(65) Prior Publication Data

US 2024/0185075 A1    Jun. 6, 2024

(51) Int. Cl.
*G06N 3/084* (2023.01)
*H04N 19/513* (2014.01)
*H04N 19/573* (2014.01)
*H04N 19/91* (2014.01)

(52) U.S. Cl.
CPC ........... *G06N 3/084* (2013.01); *H04N 19/521* (2014.11); *H04N 19/573* (2014.11); *H04N 19/91* (2014.11)

(58) Field of Classification Search
CPC .... H04N 19/521; H04N 19/573; H04N 19/91; H04N 19/172; G06N 3/084; G06N 3/045; G06N 3/047; G06N 3/088
See application file for complete search history.

(56) References Cited

U.S. PATENT DOCUMENTS

2020/0021873 A1*   1/2020   Swaminathan ...... H04N 21/466

OTHER PUBLICATIONS

Feng, Runsen, et al. "Versatile learned video compression." arXiv preprint arXiv:2111.03386 (2021) (Year: 2021).*
Wang, Chaoyue, et al. "Evolutionary generative adversarial networks." IEEE Transactions on Evolutionary Computation 23.6 (2019): 921-934. (Year: 2019).*

(Continued)

*Primary Examiner* — Jay A Morrison
(74) *Attorney, Agent, or Firm* — Arch & Lake LLP

(57) ABSTRACT

A method, an apparatus, and a non-transitory computer-readable storage medium for video compression using a generative adversarial network (GAN) are provided. The method includes obtaining, by a generator of the GAN, a reconstructed target frame based on a reference frame and a raw target frame to be reconstructed; concatenating, by a transformer-based discriminator of the GAN, the reference frame, the raw target frame and the reconstructed target frame to obtain a paired data; determining, by the transformer-based discriminator of the GAN, whether the paired data is real or fake to guide reconstruction of the raw target frame; and determining a generator loss and a transformer-based discriminator loss, and performing gradient back propagation and updating network parameters of the GAN based on the generator loss and the transformer-based discriminator loss.

20 Claims, 12 Drawing Sheets

(56) References Cited

OTHER PUBLICATIONS

T. Wiegand, G. J. Sullivan, G. Bjontegaard, and A. Luthra, "Overview of the h.264/avc video coding standard," IEEE Trans. Circuits Syst. Video Technol, vol. 13, No. 7, pp. 560-576, Aug. 2003, (17p).

G. J. Sullivan, J. R. Ohm, W. J. Han, and T. Wiegand, "Overview of the high efficiency video coding (hevc) standard," IEEE Trans. Circuits Syst. Video Technol., vol. 22, No. 12, pp. 1649-1668, Dec. 2012, (20p).

B. Bross, Y. K. Wang, Y. Ye, S. Liu, J. Chen, G. J. Sul-livan, and J. R. Ohm, "Overview of the versatile video coding (vvc) standard and its applications," IEEE Trans. Circuits Syst. Video Technol., vol. 31, No. 10, pp. 3736-3764, Aug. 2021, (29p).

C. Y. Wu, N. Singhal, and P. Krahenbuhl, "Video com-pression through image interpolation," in Proc. Eur. Conf. Comput. Vision, Aug. 2018, pp. 416-431, (18p).

A. Habibian, T. V. Rozendaal, J. M. Tomczak, , and T. S. Cohen, "Video compression with rate-distortion autoen-coders," in Proc. Int. Conf. Comput. Vision, Oct. 2019, (10p).

G.Lu,W.Ouyang,D.Xu,X.Zhang,C.Cai,andZ.Gao, "Dvc: An end-to-end deep video compression frame-work," in Proc. IEEE/CVF Conf. Comput. Vision and Pattern Recognit., Jun. 2019, pp. 11006-11015, (10p).

R. Yang, F. Mentzer, L. V. Gool, and R. Timofte, "Learning for video compression with hierarchical qual-ity and recurrent enhancement," in Proc. IEEE/CVF Conf. Comput. Vision and Pattern Recognit., Jun. 2020, pp. 6628-6637, (10p).

R. Yang, F. Mentzer, L. V. Gool, and R. Timofte, "Learning for video compression with recurrent auto-encoder and recurrent probability model," IEEE Trans. Selected Topics in Signal Process., vol. 15, No. 2, pp. 388-401, Dec. 2020, (14p).

E. Agustsson, M. Tschannen, F. Mentzer, R. Timofte, and L. V. Gool, "Generative adversarial networks for extreme learned image compression," in Proc. Int. Conf. Comput. Vision, Oct. 2019, pp. 221-231, (11p).

S. Iwai, T. Miyazaki, Y. Sugaya, and S. Omachi, "Fidelity-controllable extreme image compression with generative adversarial networks," in Proc. IEEE/CVF Conf. Comput. Vision and Pattern Recognit., Jan. 2021, pp. 8235-8242, (8p).

R. Yang, R. Timofte, and L. V. Gool, "Perceptual video compression with recurrent conditional gan," in Pro-cessings of the International Joint Conference on Artifi-cial Intelligence (IJCAI), 2022, (8p).

A. Vaswani, N. Shazeer, N. Parmar, J. Uszkoreit, L. Jones, A.N. Gomez, L. Kaiser, and I. Polosukhin, "Attention is all you need," in Proc. Adv. Neural Inf. Process. Syst., Dec. 2017, pp. 5998-6008, (11p).

A. Dosovitskiy, L. Beyer, A. Kolesnikov, D. Weissenborn, X. Zhai, T. Unterthiner, M. Dehghani, M. Min-derer, G. Heigold, S. Gelly, and J. Uszkoreit, "An image is worth 16x16 words: Transformers for image recogni-tion at scale," arXiv:2010.11929, 2021, (22p).

N. Carion, F. Massa, G. Synnaeve, N. Usunier, A. Kir-illov, , and S. Zagoruyko, "End-to-end object detection with transformers," in Proc. Eur. Conf. Comput. Vision, Aug. 2020, pp. 213-229, (17p).

F. Yang, H. Yang, J. Fu, H. Lu, and B. Guo, "Learning texture transformer network for image super-resolution," in Proc. IEEE/CVF Conf. Comput. Vision and Pattern Recognit., Jun. 2020, pp. 5791-5800, (10p).

J. Johnson, A. Alahi, and F. Li., "Perceptual losses for real-time style transfer and super-resolution," in Proc. Eur. Conf. Comput. Vision, Oct. 2016, pp. 694-711.

F. Bellard, "Bpg image format," https://bellard.org/bpg/, 2018, (3p).

A. Ranjan and M. J. Black, "Optical flow estimation using a spatial pyramid network," in Proc. IEEE/CVF Conf. Comput. Vision and Pattern Recognit., Jun. 2017, pp. 4161-4170, (10p).

I. Goodfellow, J. Pouget-Abadie, M. Mirza, B. Xu, D. Warde-Farley, S. Ozair, A. Courville, and Y. Bengio, "Generative adversarial nets," in Proc. Adv. Neural Inf. Process. Syst., Dec. 2014, pp. 2672-2680, (9p).

K. Simonyan and A. Zisserman, "Very deep convolutional networks for large-scale image recognition," in Proc. Int. Conf. on Learning Representations, May 2015, (14p).

J. Ballé, D. Minnen, S. Singh, S. J. Hwang, and N. John-ston, "Variational image compression with a scale hyperprior," in Proc. Int. Conf. on Learning Representa-tions, May 2018, (20p).

T. Xue, B. Chen, J. Wu, D. Wei, and W. T. Freeman, "Video enhancement with task-oriented flow," IEEE Trans. Int. Comput. Vision, vol. 127, No. 8, pp. 1106-1125, Aug. 2019, (20p).

M. Heusel, H. Ramsauer, T. Unterthiner, B. Unterthiner, and S. Hochreiter, "Gans trained by a two time-scale update rule converge to a local nash equilibrium," in Proc. Adv. Neural Inf. Process. Syst., 2017, (12p).

M. Bińkowski, D. J. Sutherland, M. Arbel, and A. Gretton, "Demystifying mmd gans," in Proc. Int. Conf. on Learning Representations, May 2018, (36p).

F. Mentzer, G. D. Toderici, M. Tschannen, and E. Agustsson, "High-fidelity generative image compression," Adv. Neural Inf. Process. Syst., vol. 33, Jan. 2020, (12p).

\* cited by examiner

| Obtain the first intra frame which is compressed by BPG (traditional image compression method) and other $n$ raw P frames as inputs to the generator. These $n$ P frames are the target frames to be reconstructed and they are generated sequentially. For the first run, the intra frame is working as the reference frame to generate the first P frame. From the second run, the generated P frame from the previous run is working as the reference frame to generate the current P frame. They are named as the reference frame and target frame in the following chart whether it is the first run or not. (1)     402 |
|---|

↓

| Feed both the raw target frame and the reference frame into the motion estimation network to estimate motion. (2)     404 |
|---|

↓

| The estimated motion obtained in (2) is encoded by the motion encoder network. Then the encoded motion is quantized into the quantized encoded motion. After that, use entropy encoding to convert the quantized encoded motion into a bit stream. (3)     406 |
|---|

↓

| Use entropy decoding to decode the bit stream obtained in (3) and dequantize it into dequantized encoded motion. Then feed it into the motion decoder network to get the decoded motion. Warp the decoded motion with the reference frame in (1) to get the warped target frame. (4)     408 |
|---|

↓

| Concatenate the warped target frame in (4), the reference frame in (1) and the reconstructed motion in (5) together as one tensor. Feed the tensor into the motion compensation convolutional neural network to get the predicted target frame. (5)     410 |
|---|

↓

| By subtracting the predicted target frame in (5) from the raw target frame in (1) to get the residue. Feed the residue into the residue encoder network to get the encoded residue. Quantize it into quantized encoded residue and then use entropy encoding to convert the quantized encoded residue into a residue bit stream. (6)     412 |
|---|

↓

| Use entropy decoding to decode the bit stream obtained in (6) and then dequantize the result into dequantized encoded residue. Also feed the dequantized encoded residue into the residue decoder to get the reconstructed residue. Then add the reconstructed residue back to the predicted target frame in (5) to get the final reconstructed target frame. (7)     414 |
|---|

FIG. 4

Concatenate the quantized encoded motion in (3) and quantized encoded residue in (6) together and then feed it into the Spatial Feature Extractor (SFE) to get the extracted feature. The extracted feature and the estimated flow from (2) are further concatenated to form the condition. (8)  502

Concatenate the raw target frame, raw reference frame and condition from (8) as the true data, labeled as 1. Concatenate the generated target frame, generated reference frame and condition as the fake data, labeled as 0. Obtain the paired data as (fake date, 0) and (true data, 1). (9)  504

Feed the paired data of (9) into the feature extraction convolutional neural network. Flatten the extracted features. (10)  506

Feed the flattened features into the transformer block, which is combined of LayerNorm, multi-head self-attention and multi-layer perceptron module, to get the transformed feature. (11)  508

Feed the transformed feature into the multi-layer perceptron head and the sigmoid activation function to infer if it is the real or fake. (12)  510

FIG. 5

The generator loss includes five terms. The generator loss term is based on the reconstructed target frame in (12). The distortion loss term is based on the mean squared error (MSE) between the raw target frame in (1) and the reconstructed target frame in (12). The feature loss is the MSE between the discriminator features extracted from three scales of the reconstructed target frame and the raw target frame. The entropy loss is based on the estimated entropy of the quantized encoded motion and residue. The perceptual loss is the summed MSE between the true data and the fake data features which are extracted from 5 different layers of VGG19 net. (13)  602

The discriminator loss is based on the last-layer discriminator features extracted from both the reconstructed target frame in (12) and the raw target frame in (1). (14)  604

Train the generator and the discriminator alternatively. Perform gradient back propagation and update the network parameters based on the generator loss calculated in (13) and the discriminator loss obtained in (14). (15)  606

FIG. 6

GENERATIVE VIDEO COMPRESSION WITH A TRANSFORMER-BASED DISCRIMINATOR

FIELD

The present application generally relates to video compression, and in particular but not limited to, video compression based on generative adversarial networks (GANs).

BACKGROUND

With the growing popularity of video streaming, the requirement for effective video coding (VC) schemes has risen exponentially. In the past decades, various VC standards were developed, such as H.265 and versatile video coding (VVC). Nevertheless, traditional video codecs are handcrafted and not able to be end-to-end optimized.

SUMMARY

The present disclosure describes examples of techniques relating to video compression based on GANs.

According to a first aspect of the present disclosure, a method for video compression using a generative adversarial network (GAN) is provided. The method includes obtaining, by a generator of the GAN, a reconstructed target frame based on a reference frame and a raw target frame to be reconstructed; concatenating, by a transformer-based discriminator of the GAN, the reference frame, the raw target frame and the reconstructed target frame to obtain a paired data; determining, by the transformer-based discriminator of the GAN, whether the paired data is real or fake to guide reconstruction of the raw target frame, where the reconstruction of the raw target frame comprises encoding and decoding of target frames; and determining a generator loss and a transformer-based discriminator loss, and performing gradient back propagation and updating network parameters of the GAN based on the generator loss and the transformer-based discriminator loss.

According to a second aspect of the present disclosure, an apparatus for video compression is provided. The apparatus includes one or more processors and a memory configured to store a generative adversarial network (GAN) comprising a generator and a transformer-based discriminator, the GAN being executable by the one or more processors. Upon execution of the instructions, the one or more processors are configured to: obtain a reconstructed target frame based on a reference frame and a raw target frame to be reconstructed; concatenate the reference frame, the raw target frame and the reconstructed target frame to obtain a paired data; determine whether the paired data is real or fake to guide reconstruction of the raw target frame, where the reconstruction of the raw target frame comprises encoding and decoding of target frames; and determine a generator loss and a transformer-based discriminator loss, and perform gradient back propagation and update network parameters of the GAN based on the generator loss and the transformer-based discriminator loss.

According to a third aspect of the present disclosure, a non-transitory computer readable storage medium including instructions stored therein is provided. Upon execution of the instructions by one or more processors, the instructions cause the one or more processors to perform acts including: obtaining, by a generator of a generative adversarial network (GAN), a reconstructed target frame based on a reference frame and a raw target frame to be reconstructed; concatenating, by a transformer-based discriminator of the GAN, the reference frame, the raw target frame and the reconstructed target frame to obtain a paired data; determining, by the transformer-based discriminator of the GAN, whether the paired data is real or fake to guide reconstruction of the raw target frame, where the reconstruction of the raw target frame comprises encoding and decoding of target frames; and determining a generator loss and a transformer-based discriminator loss, and performing gradient back propagation and updating network parameters of the GAN based on the generator loss and the transformer-based discriminator loss.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 4 is a flowchart illustrating a method of generative video compression with a transformer-based discriminator in accordance with an example of the present disclosure.

FIG. 5 is a flowchart illustrating a method of generative video compression with a transformer-based discriminator in accordance with an example of the present disclosure.

FIG. 6 illustrates an example of loss functions and network training of generative video compression with a transformer-based discriminator in accordance with an example of the present disclosure.

DETAILED DESCRIPTION

Figure 1A:
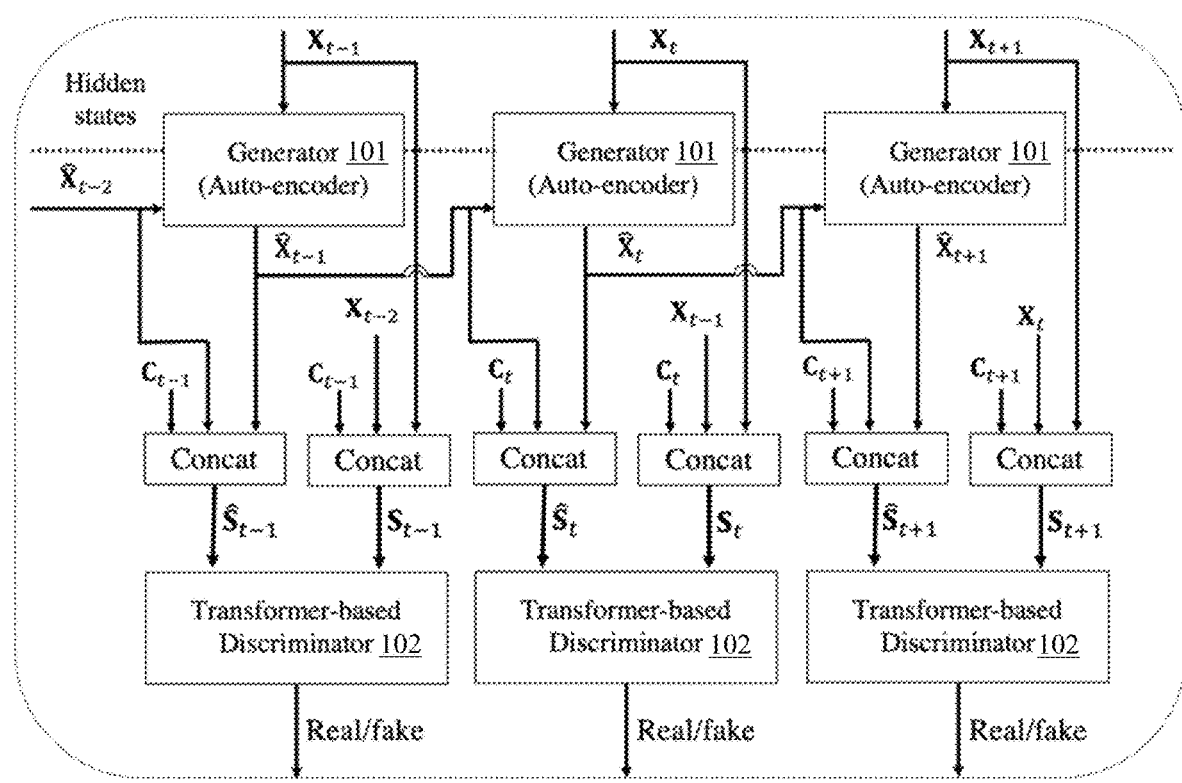
FIG. 1A illustrates a generative video compression framework in accordance with an example of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may include steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The present disclosure provides a method, an apparatus and a non-transitory computer-readable storage medium for video compression using a generative adversarial network (GAN).

Recently, deep learning schemes are applied to VC. In some prior arts, it's proposed to predict target frames using CNN-based autoencoders; learn context interaction for VC through 3D convolutions; and developed a CNN-based deep video compression (DVC) approach that jointly optimizes motion and residual compression modules. Afterwards, the hierarchical learned video compression (HLVC) and recurrent learned video compression (RLVC) are put forward to compress frames with a larger group-of-pictures (GOP) size and have achieved state-of-the-art rate-distortion performances. Although the aforementioned VC methods have demonstrated effectiveness, their decoded frames often suffer from blur at low bit rates, due to the use of the mean-squared error (MSE) as the loss function.

Recently, generative adversarial network (GAN) draws much attention in the field of image coding, since it can preserve sharper and more detailed textures compared to non-adversarial learning methods, especially at low bit rates. A natural next-step development is to extend it to GAN-based VC. Lately, perceptual learned video compression (PLVC) integrates adversarial learning into a learned video compression system. It has achieved state-of-the-art perceptual quality in learned video compression and outperforms pure CNN- and RNN based schemes. Nevertheless, the discriminator in PLVC is a CNN-based classifier. Although effective in catching local features, it lacks the ability that transformer has, which are modeling long-distance dependencies and extracting global features. The transformer was first proposed and validated in natural language processing (NLP) to explore the global correlations among input sequences. Vision transformers have also shown success in image classification and object detection.

This disclosure provides a novel generative video compression (GVC) approach: 1) For the first time in the literature, a transformer is used in a GAN-based VC system; 2) A new generator (G) loss function is proposed that not only constrains the collective pixel distortion and entropy of multiple compressed frames, but also employs a discriminator-dependent feature loss and a perceptual loss to improve the perceptual quality of the decoded frames. Experimental studies on HEVC test sequences reveal that GVC outperforms several state-of-the-art learned video compression approaches and the Low-Delay P (LDP) very fast and default configurations of the H.265 codec both quantitatively and qualitatively, especially at low bit rates.

T successive video frames are considered, $X_t$, t= 1, 2, . . . , T. The first I frame $X_1$ is intra-encoded and decoded as $\hat{X}_1$ using the traditional image compression approach BPG. The remaining frames, $X_2, \ldots, X_T$, are P frames that are inter-encoded with our proposed GVC. FIG. 1A illustrates the proposed GVC framework within three successive time slots. In one time slot, the GVC includes one Generator 101, and one Transformer-based discriminator 102.

A. Generator 101

Figure 1B:
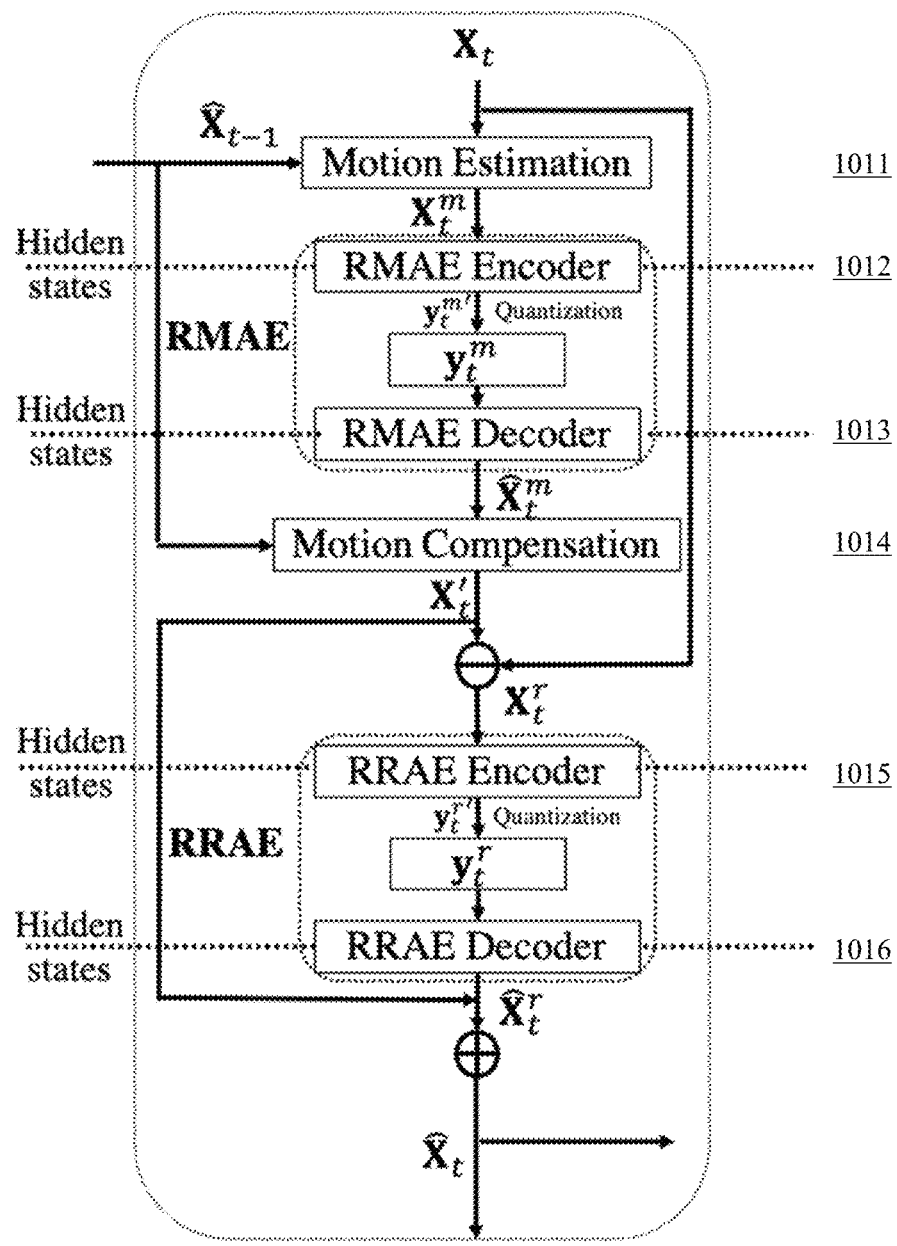
FIG. 1B is a block diagram illustrating a structure of the generator G in accordance with an example of the present disclosure.

FIG. 1B shows the structure of the generator 101, which includes motion estimation 1011, recurrent motion auto-encoder (RMAE) 1012, motion compensation (MC) 1014 and recurrent residual auto-encoder (RRAE) 1015 modules. The RMAE 1012, 1013 and RRAE 1015, 1016 modules explore the temporal corrections between adjacent video frames. At time slot t, $X_t \in \mathbb{R}^{H \times W \times 3}$ and $\hat{X}_{t-1} \in \mathbb{R}^{H \times W \times 3}$ are the target P frame and the decoded previous frame that serves as the reference frame.

Firstly, the spatial pyramid network (SPN) is applied to $X_t$ and $\hat{X}_{t-1}$ to estimate the motion $X_t^m \in \mathbb{R}^{h \times w \times 2}$. Then $X_t^m$ is encoded, quantized and decoded by RMAE, denoted as $y_t^{m'}$, $y_t^m$ and $\hat{X}_t^m$ respectively. The motion compensation module takes $\hat{X}_t^m$ and $\hat{X}_{t-1}$ as the input, performs warping and convolutions to generate the predicted target frame $X'_t$. Subsequently, the residual $X_t^r$ is obtained by subtracting $X'_t$ from $X_t$, which is then encoded, quantized and decoded by the RRAE module, denoted as $y_t^{r'}$, $y_t^r$ and $\hat{X}_t^r$. The decoded residual $\hat{X}_t^r$ is then added to the motion-compensated frame $X'_t$ to get the decoded target frame $\hat{X}_t$. In addition, the quantized motion $y_t^m$ and residual $y_t^r$ are both encoded into bit streams by using range coding.

B. Transformer-Based Discriminator 102

Figure 1C:
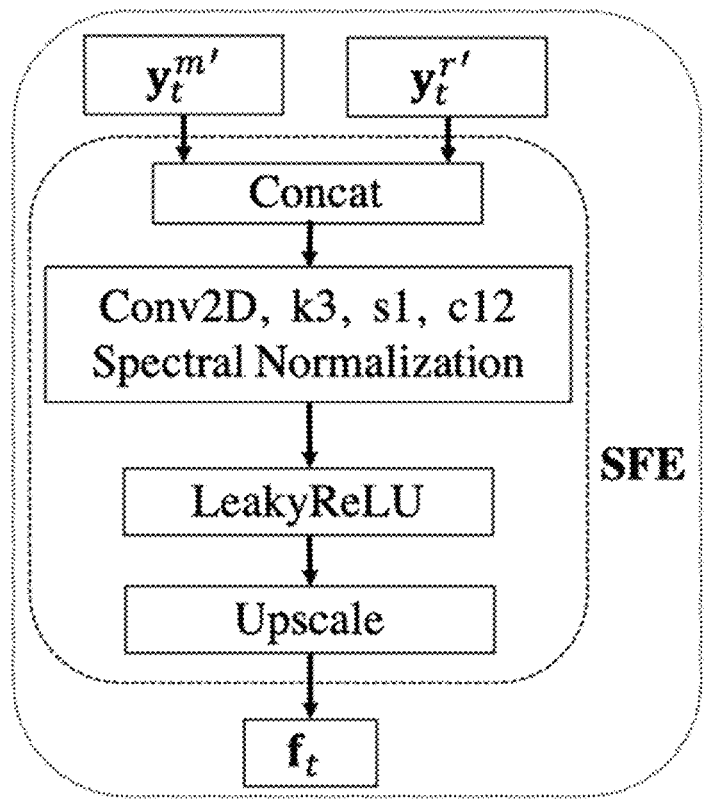
FIG. 1C is a block diagram illustrating a structure of a spatial feature extractor (SFE) in accordance with an example of the present disclosure.
Figure 1D:
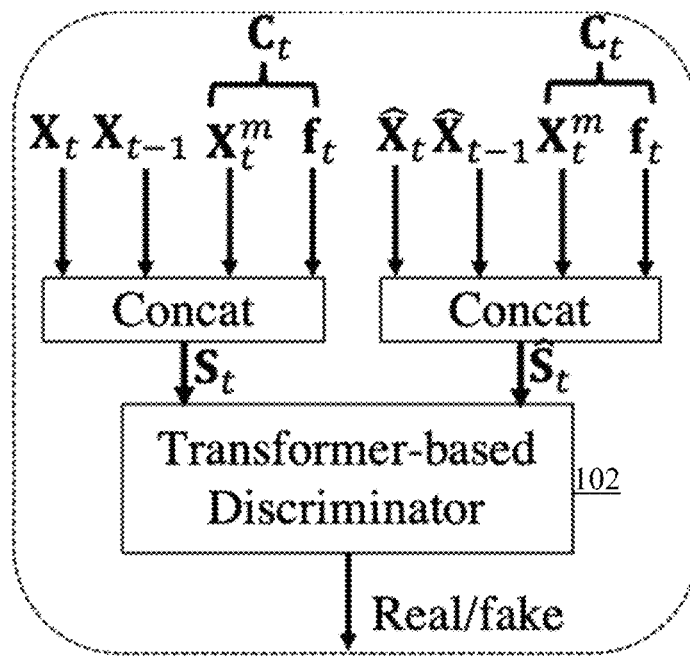
FIG. 1D is a block diagram illustrating the real and fake inputs of the discriminator in accordance with an example of the present disclosure.

It is the first time that a transformer-based discriminator (TD) 102 is adopted in a GAN-based VC framework. Besides, in TD, spatial-temporal side information is integrated as conditions which are essential and effective in video coding systems. It is expected that the conditional GAN have the potential to generate frames with temporal consistency and rich texture, which motivates us to adopt conditions in GVC. FIG. 1D depicts the real and fake inputs of the TD. The real pair $(X_t, X_{t-1})$ and fake pair $(\hat{X}_t, \hat{X}_{t-1})$ are each concatenated with the condition $C_t$ to form the real $S_t$ and fake input sample $\hat{S}_t$. The condition is consisted of the estimated temporal motion information $X_t^m$, and the spatial feature $f_t$ that is extracted by spatial feature extractor (SFE) as shown in FIG. 1C. The transformer-based discriminator (TD) 102 determines whether the paired data is fake or real to guide the reconstruction of raw target frames, for example, encoding and decoding of the target frames. The last layer of the TD is a sigmoid activation function layer, the output range of the sigmoid function is between 0 and 1. Therefore, a threshold is used to determine which output is real or which is fake. Here, for example, the threshold is 0.5. If the sigmoid function output is between 0 and 0.5, it will be labelled as fake data. (The Closer to 0, the better, since the label of fake data is 0). If the sigmoid function output is between 0.5 and 1, it will be labelled as real data. (The Closer to 1, the better, since the label of real data is 1). The loss function used during training is to guarantee that the label of the real data is closer to 1 and the label of the fake data is closer to 0.

Figure 2:
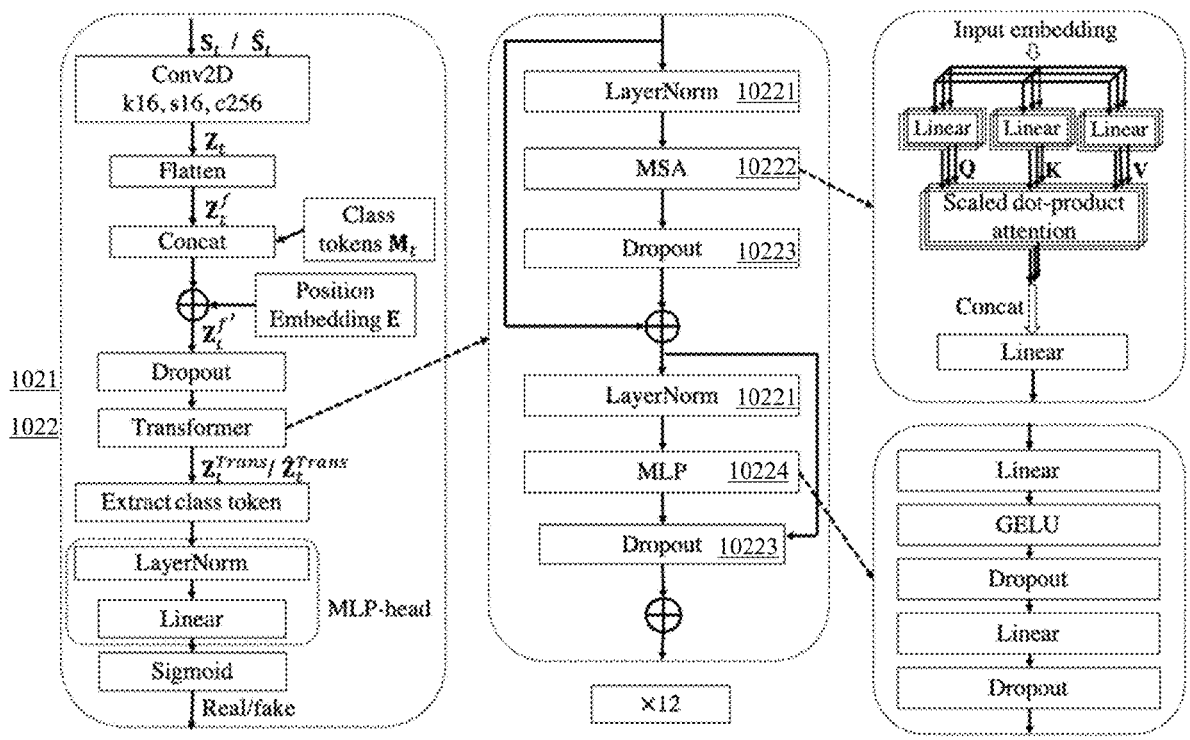
FIG. 2 illustrates a GAN-based inter-frame video coding architecture in accordance with an example of the present disclosure.

The structure of the discriminator D 102 is depicted in FIG. 2. To leverage both local and global features, TD starts with a convolution layer to extract features $Z_t \in$ $$\mathbb{R}^{\frac{H}{16} \times \frac{W}{16} \times c},$$

where c is the embedded dimension. Then $Z_t$ is pre-processed to get the tensor $Z_t^{f'}$. After going through a dropout layer 1021, it is then processed by the 12-layer transformer blocks 1022 to get $Z_t^{Trans}$. Each layer includes a multi-head self-attention (MSA) block 10222 with h=8 heads and a multi-layer perceptron (MLP) block 10224. Layer normalization (LayerNorm) 10221 is applied before each block, dropout layer 10223 and residual connection are applied after each block. After that, class token is extracted and an MLP-head (FIG. 2 bottom left) and a Sigmoid function are performed to output the class probability. The aforementioned workflow applies to both the real and fake input samples.

C. Loss Functions

It is proposed to train G and TD alternately. The loss function adopted to train the G is consisted of 5 terms. The first component is the adversarial loss defined as eq. (1). Minimizing it enforces the classification label of the decoded pair $(\hat{X}_t, \hat{X}_{t-1})$ to approach 1 to fool the TD.

$$L_{adv}(G) = \sum_{t=2}^{T} \ln\left(1 - D(\hat{X}_t, \hat{X}_{t-1}|C_t)\right). \tag{1}$$

The second distortion loss eq. (2) is the MSE between the raw $X_t$ and the decoded target P frame $\hat{X}_t$.

$$L_d(G) = \sum_{t=2}^{T} MSE(X_t, \hat{X}_t). \tag{2}$$

The third entropy term controls the bit rates, where $\phi(y_t^m)$ and $\phi(y_t^r)$ are the estimated entropy of the compressed motion $y_t^m$ and residual $y_t^r$, as shown in eq. (3).

$$L_e(G) = \sum_{t=2}^{T} (\phi(y_t^m) + \phi(y_t^r)). \tag{3}$$

These three terms make up the base loss as eq. (4), where $\lambda_g$, $\lambda_d$ and $\lambda_e$ are the hyper-parameters.

$$L_{base}(G) = \lambda_g L_{adv}(G) + \lambda_d L_d(G) + \lambda_e L_e(G). \tag{4}$$

The fourth component is the feature matching loss defined as eq. (5). It is the mean absolute error (MAE) between the transformer's output $Z_t^{Trans}$ t and $\hat{Z}_t^{Trans}$ which are extracted from the real and fake input respectively.

$$L_f(G) = \sum_{t=2}^{T} MAE\left(Z_t^{Trans}, \hat{Z}_t^{Trans}\right). \tag{5}$$

In order to validate the effectiveness of the proposed feature loss in eq. (5). The GVC baseline model is trained with the base loss in eq. (4). Feature loss is added in eq. (6) to train the GVC baseline-feature model, where $\lambda_f$ is the hyper-parameter.

$$L_{bf}(G) = L_{base}(G) + \lambda_f L_f(G). \tag{6}$$

The last component is the perceptual loss as defined in eq. (7), which measures the perceptual and semantic differences between the raw and decoded target frame. The 19-layer VGG network is adopted to extract features from 5 layers: relu1-1, relu2-1, relu3-1, relu4-1 and relu5-1. $F_{t,l}$ and $\hat{F}_{t,l}$ denote the l-th layer feature with $N_l$ elements of the VGG-net, extracted from $X_t$ and $\hat{X}_t$.

$$L_{vgg}(G) = \sum_{t=2}^{T} \sum_{l=1}^{5} \frac{\|F_{t,l} - \hat{F}_{t,l}\|^2}{N_l}. \tag{7}$$

The overall generator loss is defined as eq. (8), where $\lambda_v$ and $\lambda_e$ trade-off the three components.

$$L_G(G) = L_{base}(G) + \lambda_f L_f(G) + \lambda_v L_{VGG}(G) \tag{8}$$

The loss function adopted to train the TD is defined as eq. (9). Minimizing $L_D(D)$ means that $D(\hat{X}_t, \hat{X}_{t-1}|C_t)$ should approach 0 (fake label), and D $((X_t, X_{t-1})|C_t)$ should approach 1 (real label), which can learn a discriminator that distinguishes the decoded target frames from the raw target frames.

$$L_D(D) = \sum_{t=2}^{T} \left(-\ln\left(1 - D(\hat{X}_t, \hat{X}_{t-1}|C_t)\right) - \ln(D((X_t, X_{t-1})|C_t))\right) \tag{9}$$

D. Datasets and Experiment Settings

The proposed GVC model is trained on the Vimeo-90 k dataset that contains 91 k video sequences, each having 7 consecutive and the frame resolution is 448×256. In one or more embodiments, during the training, the frames are cropped to 256×256. The first I frame is compressed by BPG and others are 6 P frames. Hence, in training, we set T=7. The hyper-parameters of the generator loss are set as $\lambda_g=0.1$, $\lambda_d=100$, $\lambda_f1$ and $\lambda_v=1$. For the entropy term, we adjust $\lambda_e$ by using $\alpha_1$ and $\alpha_2$ to approach a specified target bit rate $R_t$. As shown in Table 1, we set 5 levels of target bit rate $R_t$, and trained a model of our proposed GVC for each $R_t$. During training, if the actual bit rate is larger than $R_t$, then $\lambda_e$ is set as $\alpha_1$, otherwise, it is set as $\alpha_2$ and $\alpha_2 \ll \alpha_1$.

TABLE 1

Hyper-parameters of the entropy loss.

| Level | $R_t$ | $\alpha_1$ | $\alpha_2$ |
|---|---|---|---|
| 1 | 0.0025 | 60 | 0.01 |
| 2 | 0.0125 | 20 | 0.01 |
| 3 | 0.025 | 3 | 0.01 |
| 4 | 0.05 | 1 | 0.01 |
| 5 | 0.1 | 0.3 | 0.001 |

Experimental studies are conducted on the HEVC (Class B, C, D and E) test sequences. To prevent error propagation, we adopt the bi-directional IPPP (bi-IPPP) structure in testing. A GOP has 13 frames: $X_t$, t=1, 2, . . . , 13. The first frame $X_1$ is an I frame, followed by 6 P frames $X_t$, t=2, . . . , 7 which are compressed by forward predictive coding as described above. Afterwards, the first frame $X_{14}$ in the next GOP, which is also an I frame, is used to conduct predictive coding for $X_t$, t=13, 12, . . . , 8 in a backward direction. We compare our proposed GVC model with five existing video coding methods, including three state-of-the-art learned video compression schemes PLVC, RLVC (PSNR) model, RLVC (MS-SSIM) model, and two configurations of the traditional H.265 video codec: the LDP very fast setting and the LDP default setting of x265. For fair comparison, the probability distribution model is adopted to estimate the entropy for GVC, PLVC, RLVC (PSNR) and RLVC (MS-SSIM) model. In this probability distribution model, it uses a flexible probability density model to estimate entropy. Because data compression always involves discretization, the entropies are the estimated value. During training, discretization is modelled using additive uniform noise to ensure differentiability. The entropies computed during training are differential entropies. During evaluation, the data is actually quantized, and the entropies are discrete (Shannon entropies).

E. Evaluation Metrics

The performance is evaluated subjectively by the visual quality of the decoded frames and quantitatively by perceptual quality metrics: Fréchet Inception Distance (FID) and Kernel Inception Distance (KID). They evaluate the similarity between the distributions of the raw frames and the decoded frames, and have been validated to be effective for evaluating perceptual quality.

F. Performance Analysis

Figure 3A:
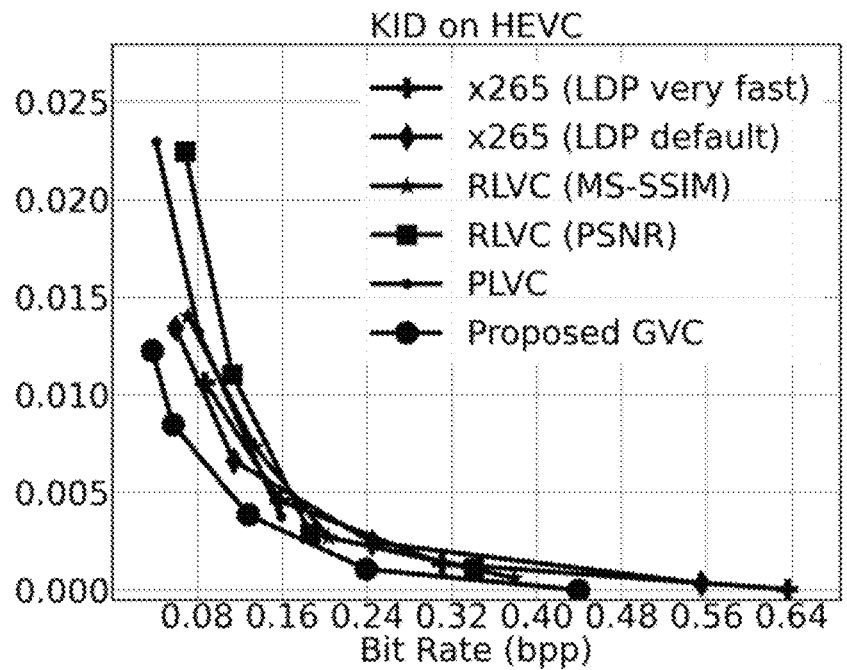
FIG. 3A illustrates the quantitative analysis results in accordance with an example of the present disclosure.
Figure 3B:
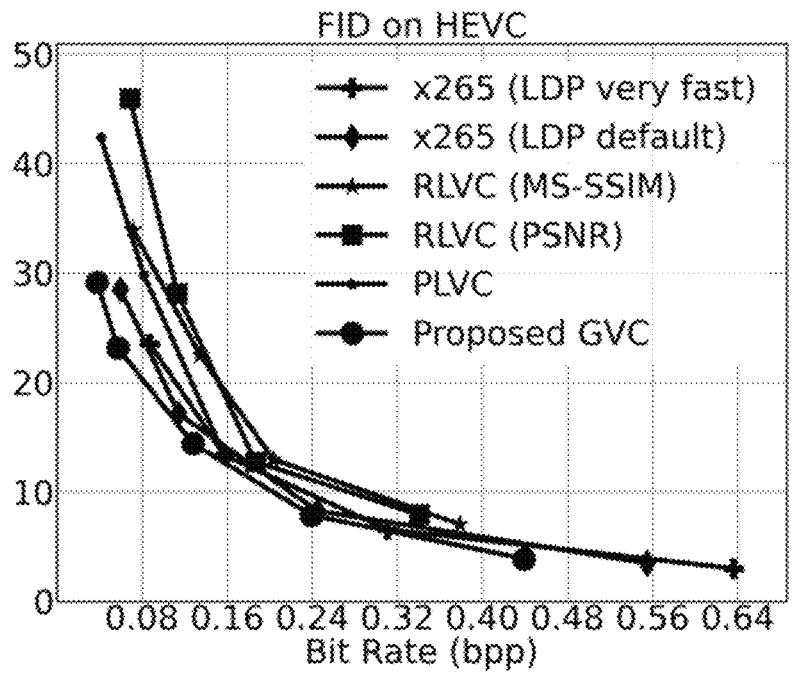
FIG. 3B illustrates the quantitative analysis results in accordance with an example of the present disclosure.

The quantitative results, FID and KID curves against various bit rates, are shown in FIGS. 3A and 3B. We observe that GVC achieves the best FID and KID scores at almost all bit rates. At low bit rate range (<0.1 bpp), it significantly outperforms all other methods. The GAN-based video coding method PLVC also outperforms two RLVC models which do not unitize adversarial learning, however, PLVC is still worse than the x265 (LDP very fast) and x265 (LDP default).

Figure 3C:
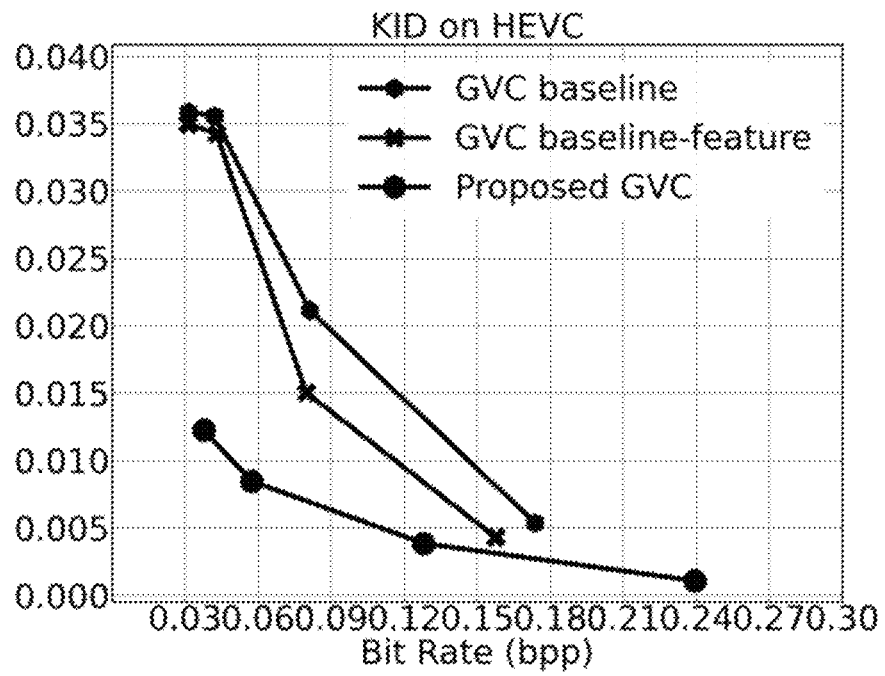
FIG. 3C illustrates the quantitative analysis results in accordance with an example of the present disclosure.
Figure 3D:
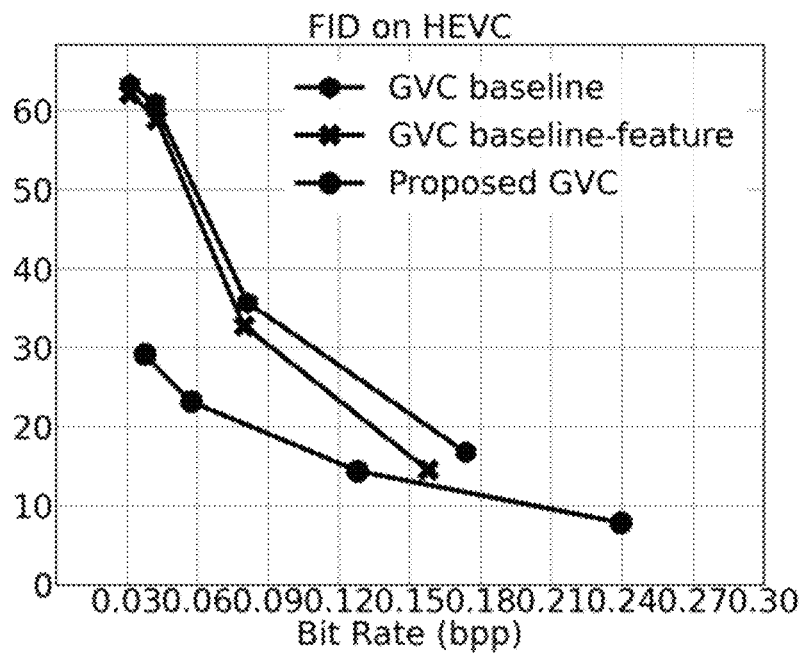
FIG. 3D illustrates the quantitative analysis results in accordance with an example of the present disclosure.
Figure 3E:
FIG. 3E illustrates the enlarged spatial textures of the decoded frames in accordance with an example of the present disclosure.
Figure 3F:
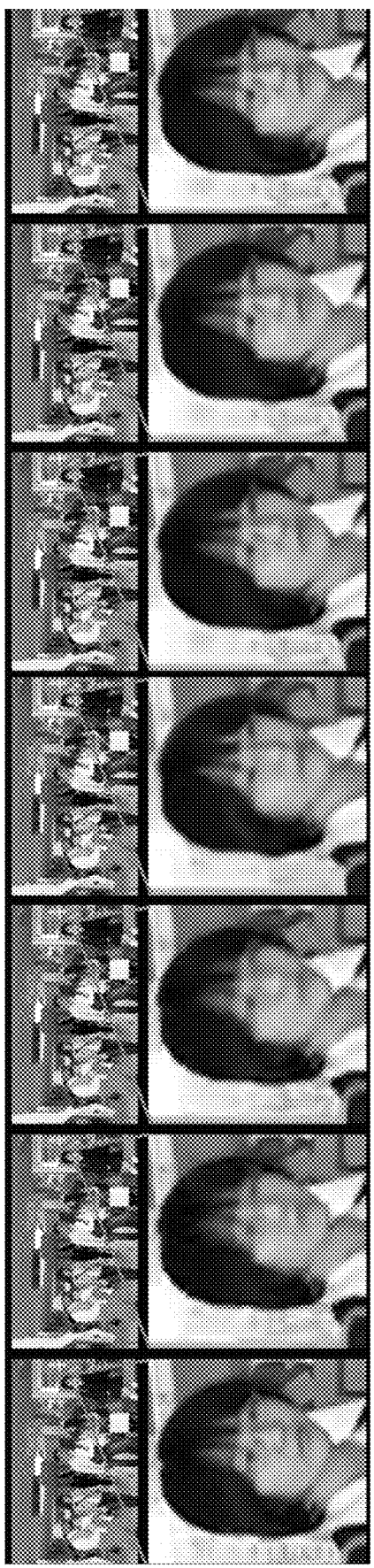
FIG. 3F illustrates the enlarged spatial textures of the decoded frames in accordance with an example of the present disclosure.
Figure 3G:
FIG. 3G illustrates the enlarged spatial textures of the decoded frames in accordance with an example of the present disclosure.

FIGS. 3E, 3F and 3G show the enlarged spatial textures of the decoded frames. Compared to the other five schemes, GVC exhibits excellent performance at extreme low bit rates (0.036 bpp to 0.067 bpp), by decoding richer photo-realistic textures. x265 (LDP very fast), x265 (LDP default), and RLVC (MS SSIM) model require much higher bit rates (1.25x to 2.43x) than GVC. However, their decoded frames are quite blurry and noisy, such as the leaves and walls in FIG. 3E, the girl's face in FIG. 3F and the eye area of the basketball player in FIG. 3G. In contrast, the decodings of GVC are much clearer. It preserves fidelity to the ground-truth frames. The visual quality of the decoded frames produced by the RLVC (PSNR) model and the PLVC model is similar to that of the proposed GVC, but they require higher bit rates (1.03x to 1.90x). For example, in FIG. 3F, the RLVC (PSNR) model requires 1.89x bit rates, while PLVC requires 1.14x bit rates of GVC. Additionally, the HEVC test sequences include fast-motion videos (FIG. 3G) and slow-motion sequences (FIG. 3E) which indicate the generalization ability of GVC model.

G. Ablation Study

The ablation study is to validate the effectiveness of the proposed feature and perceptual loss in eq. (5) and (7). The GVC baseline model is trained with the base loss in eq. (4). Feature loss is added in eq. (6) to train the GVC baseline feature model. Then we add the perceptual loss to formed our proposed GVC model. In FIGS. 3C and 3D, with the additional feature loss and perceptual loss, the FID and KID scores on HEVC test sequences are getting improved (GVC<GVC baseline-feature<GVC baseline). Each component contributes to the perceptual quality, especially the VGG-based perceptual loss in eq. (7), which demonstrates the effectiveness of our proposed generator loss in eq. (8).

FIG. 4 is a flowchart illustrating a method of generative video compression with a transformer-based discriminator, applied in the generator module, in accordance with an example of the present disclosure.

In Step 402, the first intra I frame, which is compressed by BPG (traditional image compression method), and other n raw P frames are obtained as inputs to the generator. These n P frames are the target frames to be reconstructed and they are generated sequentially. For the first run, the intra I frame is working as the reference frame to generate the first P frame. From the second run, the generated P frame from the previous run is working as the reference frame to generate the current P frame. They are named as the reference frame and target frame in the following chart whether it is the first run or not.

In Step 404, both the raw target frame and the reference frame are fed into the motion estimation network to estimate motion.

In Step 406, the estimated motion obtained in Step 404 is encoded by the motion encoder network. Then the encoded motion is quantized into the quantized encoded motion. After that, use entropy encoding to convert the quantized encoded motion into a bit stream.

In Step 408, use entropy decoding to decode the bit stream obtained in Step 406 and dequantize it into dequantized encoded motion. Then feed it into the motion decoder network to get the decoded motion. Warp the decoded motion with the reference frame in Step 402 to get the warped target frame.

In Step 410, concatenate the warped target frame in Step 408, the reference frame in Step 402 and the reconstructed motion together as one tensor. Feed the tensor into the motion compensation convolutional neural network to get the predicted target frame.

In Step 412, By subtracting the predicted target frame in Step 410 from the raw target frame in Step 402 to get the residue. Feed the residue into the residue encoder network to get the encoded residue. Quantize it into quantized encoded residue and then use entropy encoding to convert the quantized encoded residue into a residue bit stream.

In Step 414, Use entropy decoding to decode the bit stream obtained in Step 412 and then dequantize the result into dequantized encoded residue. Also feed the dequantized encoded residue into the residue decoder to get the reconstructed residue. Then add the reconstructed residue back to the predicted target frame in Step 410 to get the final reconstructed target frame.

FIG. 5 is a flowchart illustrating a method of generative video compression with a transformer-based discriminator, applied in the discriminator module, in accordance with an example of the present disclosure.

In Step 502, concatenate the quantized encoded motion in Step 406 and quantized encoded residue in Step 412 together and then feed it into the Spatial Feature Extractor (SFE) to get the extracted feature. The extracted feature and the estimated flow from Step 404 are further concatenated to form the condition.

In Step 504, concatenate the raw target frame, raw reference frame and condition from Step 502 as the true data, labeled as 1. Concatenate the generated target frame, generated reference frame and condition as the fake data, labeled as 0. Obtain the paired data as (fake data, 0) and (true data, 1).

In Step 506, feed the paired data of Step 504 into the feature extraction convolutional neural network. Flatten the extracted features.

In Step 508, feed the flattened features into the transformer block, which is combined of LayerNorm, multi-head self-attention and multi-layer perceptron module, to get the transformed feature.

In Step 510, feed the transformed feature into the multi-layer perceptron head and the sigmoid activation function to infer if it is the real or fake.

In compression task, the target is to compress the raw target frame and then decompress to get the reconstructed target frame. The closer the reconstructed target frame is to the raw target image, the better. In this GAN network, the G and D are doing adversarial training, while training G, D is frozen, and vice versa.

Step 1: Generator is mainly used to compress and decompress to get the frame. It aims to let the reconstructed frame is as close to the raw frame as possible. While training G, since D is frozen, labelled training data does not need to be feed into D at this stage. But in training G, there is another goal to fool the discriminator. That means, even the reconstructed data is fed (without label) to the D, D can output a probability that is closer to 1. If it is successful, it proves that the reconstructed image is as realistic as the raw image. The G is good enough in the current stage.

Step 2: In the next stage, G is frozen and D is trained. At this time, the paired data (with labels) is fed into the discriminator for training. The discriminator is trained to distinguish the raw(real) image and reconstructed image (fake). Then after a few training steps, the D can successfully distinguish them. It means, at this time, if the data is fake, the output of the sigmoid is in [0,0.5]. If it is real, the value is in [0.5,1]. The D is good enough in current stage.

FIG. 6 illustrates an example of loss functions and network training of generative video compression with a transformer-based discriminator in accordance with an example of the present disclosure.

In Step 602, the generator loss includes five terms. The generator loss term is based on the reconstructed target frame in Step 510. The distortion loss term is based on the mean squared error (MSE) between the raw target frame in Step 402 and the reconstructed target frame in Step 510. The feature loss is the MSE between the discriminator features extracted from three scales of the reconstructed target frame and the raw target frame. The entropy loss is based on the estimated entropy of the quantized encoded motion and residue. The perceptual loss is the summed MSE between the true data and the fake data features which are extracted from 5 different layers of VGG19 net.

In Step 604, the discriminator loss is based on the last-layer discriminator features extracted from both the reconstructed target frame in Step 510 and the raw target frame in Step 402.

In Step 606, train the generator and the discriminator alternatively. Perform gradient back propagation and update the network parameters based on the generator loss calculated in Step 602 and the discriminator loss obtained in Step 604.

Figure 7:
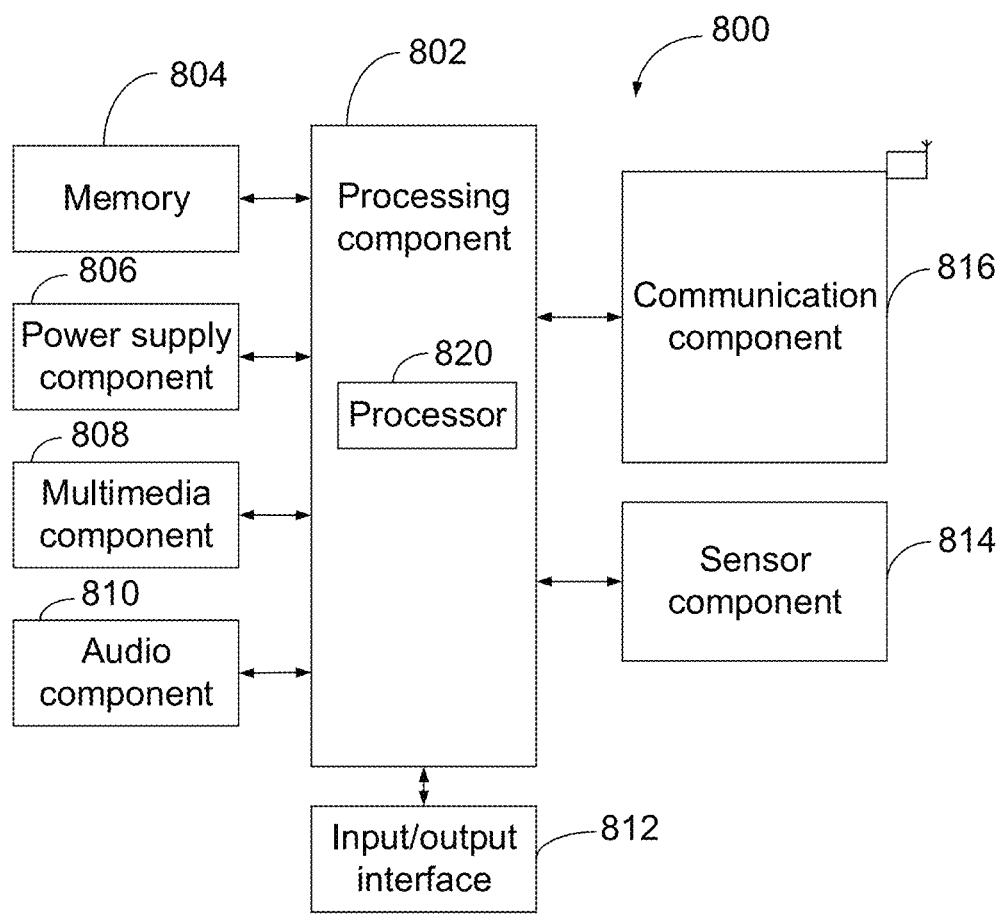
FIG. 7 is a block diagram illustrating an apparatus for video compression in accordance with an example of the present disclosure.

FIG. 7 is a block diagram illustrating an apparatus for video processing in accordance with an example of the present disclosure. The system 800 may be a terminal, such as a mobile phone, a tablet computer, a digital broadcast terminal, a tablet device, or a personal digital assistant.

As shown in FIG. 7, the system 800 may include one or more of the following components: a processing component 802, a memory 804, a power supply component 806, a multimedia component 808, an audio component 810, an input/output (I/O) interface 812, a sensor component 814, and a communication component 816.

The processing component 802 usually controls overall operations of the system 800, such as operations relating to display, a telephone call, data communication, a camera operation, and a recording operation. The processing component 802 may include one or more processors 820 for executing instructions to complete all or a part of steps of the above method. The processors 820 may include CPU, GPU, DSP, or other processors. Further, the processing component 802 may include one or more modules to facilitate interaction between the processing component 802 and other components. For example, the processing component 802 may include a multimedia module to facilitate the interaction between the multimedia component 808 and the processing component 802.

The memory 804 is configured to store different types of data to support operations of the system 800. Examples of such data include instructions, contact data, phonebook data, messages, pictures, videos, and so on for any application or method that operates on the system 800. The memory 804 may be implemented by any type of volatile or non-volatile storage devices or a combination thereof, and the memory 804 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or a compact disk.

The power supply component 806 supplies power for different components of the system 800. The power supply component 806 may include a power supply management system, one or more power supplies, and other components associated with generating, managing, and distributing power for the system 800.

The multimedia component 808 includes a screen providing an output interface between the system 800 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 808 may include a front camera and/or a rear camera. When the system 800 is in an operation mode, such as a shooting mode or a video mode, the front camera and/or the rear camera may receive external multimedia data.

The audio component 810 is configured to output and/or input an audio signal. For example, the audio component 810 includes a microphone (MIC). When the system 800 is in an operating mode, such as a call mode, a recording mode and a voice recognition mode, the microphone is configured to receive an external audio signal. The received audio signal may be further stored in the memory 804 or sent via the communication component 816. In some examples, the audio component 810 further includes a speaker for outputting an audio signal.

The I/O interface 812 provides an interface between the processing component 802 and a peripheral interface module. The above peripheral interface module may be a keyboard, a click wheel, a button, or the like. These buttons may include but not limited to, a home button, a volume button, a start button, and a lock button.

The sensor component 814 includes one or more sensors for providing a state assessment in different aspects for the system 800. For example, the sensor component 814 may detect an on/off state of the system 800 and relative locations of components. For example, the components are a display and a keypad of the system 800. The sensor component 814 may also detect a position change of the system 800 or a component of the system 800, presence or absence of a contact of a user on the system 800, an orientation or acceleration/deceleration of the system 800, and a temperature change of system 800. The sensor component 814 may include a proximity sensor configured to detect presence of a nearby object without any physical touch. The sensor component 814 may further include an optical sensor, such as a CMOS or CCD image sensor used in an imaging application. In some examples, the sensor component 814 may further include an acceleration sensor, a gyroscope sensor, a magnetic sensor, a pressure sensor, or a temperature sensor.

The communication component 816 is configured to facilitate wired or wireless communication between the system 800 and other devices. The system 800 may access a wireless network based on a communication standard, such as WiFi, 4G, or a combination thereof. In an example, the communication component 816 receives a broadcast signal or broadcast related information from an external broadcast management system via a broadcast channel. In an example, the communication component 816 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the system 800 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors, or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk etc.

In some examples, there is provided a non-transitory computer readable storage medium, having instructions stored therein. When the instructions are executed by one or more processors 820, the instructions cause the processor to perform methods as illustrated in FIGS. 4-6 and described above.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video compression, performed by a terminal using a generative adversarial network (GAN), comprising:
   obtaining, by a generator of the GAN, a reconstructed target frame based on a reference frame and a raw target frame to be reconstructed;
   concatenating, by a transformer-based discriminator of the GAN, the reference frame, the raw target frame and the reconstructed target frame to obtain a paired data, wherein the transformer-based discriminator is configured to model long-distance dependencies across the reference frame, the raw target frame and the reconstructed target frame;
   determining, by the transformer-based discriminator of the GAN, whether the paired data is real or fake to guide reconstruction of the raw target frame, wherein the reconstruction of the raw target frame comprises encoding and decoding of target frames;
   determining a generator loss and a transformer-based discriminator loss, and performing gradient back propagation and updating network parameters of the GAN based on the generator loss and the transformer-based discriminator loss to obtain a trained GAN for the terminal; and
   compressing, by the trained GAN of the terminal, a video stream for communication, storage, or processing.

2. The method for video compression of claim 1, wherein obtaining the reconstructed target frame based on the reference frame and the raw target frame to be reconstructed further comprises:
   obtaining the reference frame and the raw target frame to be reconstructed;
   obtaining, by a motion estimation network of the generator, an estimated motion based on the reference frame and the raw target frame;

encoding, by a motion encoder network of the generator, the estimated motion to obtain an encoded motion, quantizing the encoded motion into a quantized encoded motion, and converting the quantized encoded motion into a bit stream with entropy encoding;

decoding, by a motion decoder network of the generator, the bit stream with entropy decoding, dequantizing and decoding the bit stream to obtain a decoded motion, and warping the decoded motion with the reference frame to obtain a warped target frame; and concatenating the warped target frame, the reference frame and a reconstructed motion together as a tensor, and obtaining a predicted targe frame by feeding the tensor into a motion compensation convolutional neural network.

3. The method for video compression of claim 2, further comprising:

subtracting the predicted target frame from the raw target frame to obtain a residue;

obtaining, by a residue encoder network of the generator, an encoded residue by feeding the residue into the residue encoder network, quantizing the encoded residue into a quantized encoded residue, and converting the quantized encoded residue into a residual bit stream with entropy encoding; and decoding and dequantizing, by a residue decoder network of the generator, the residual bit stream to obtain a reconstructed residue, and adding the reconstructed residue to the predicted target frame to obtain a reconstructed target frame.

4. The method for video compression of claim 1, wherein the raw target frame to be reconstructed comprises a plurality of raw target frames to be constructed, and the plurality of raw target frames to be constructed are generated sequentially.

5. The method for video compression of claim 2, wherein obtaining the reference frame and the raw target frame to be reconstructed comprises:

obtaining a compressed intra I frame and a plurality of raw frames as inputs to the generator;

setting the compressed intra I frame as a first reference frame to generate a first reconstructed target P frame; and setting the first reconstructed target P frame as a second reference frame to generate a second reconstructed target P frame.

6. The method for video compression of claim 1, wherein concatenating the reference frame, the raw target frame and the reconstructed target frame to obtain a paired data further comprises:

concatenating, by the transformer-based discriminator, a quantized encoded motion and a quantized encoded residue together to feed into a Spatial Feature Extractor (SFE) to obtain an extracted feature, and concatenating the extracted feature and an estimated flow to form a condition; and concatenating the raw target frame, the raw reference frame and the condition as a true data, and concatenating the generated target frame, the generated reference frame and the condition as a fake data; and obtaining the paired data comprising the true data and the fake data.

7. The method for video compression of claim 1, wherein determining whether the paired data is real or fake further comprises:

feeding the paired data into a feature extraction convolutional neural network, and flattening the extract feature to obtain a flattened feature;

obtaining a transformed feature by feeding the flattened feature into a transformer block; and determining whether the transformed feature is real or fake by feeding the transformed feature into a multi-layer perceptron head and a sigmoid activation function.

8. The method for video compression of claim 1, wherein determining the generator loss and the transformer-based discriminator loss further comprises:

determining the generator loss for reconstructing decoded frames by determining five terms, wherein the five terms comprise an adversarial loss term, a distortion loss term, a feature matching loss term, an entropy loss term, and a perceptual loss term; and determining the discriminator loss based on last-layer discriminator probability obtained from both a reconstructed target frame and a raw target frame.

9. The method for video compression of claim 8, further comprising:

determining the adversarial loss term based on the reconstructed target frame;

determining the distortion loss term based on a mean squared error (MSE) between the raw target frame and the reconstructed target frame;

determining the feature matching loss term based on a MSE between discriminator features extracted from three scales of the reconstructed target frame and the raw target frame;

determining the entropy loss term based on an estimated entropy of a quantized encoded motion and a residue; and determining the perceptual loss term based on a summed MSE between a true data feature and a fake data feature extracted from five different layers.

10. An apparatus for video compression, for use in a terminal, comprising:

one or more processors; and a memory configured to store a generative adversarial network (GAN) comprising a generator and a transformer-based discriminator, the GAN being executable by the one or more processors, wherein the one or more processors, upon execution of the instructions, are configured to:

obtain a reconstructed target frame based on a reference frame and a raw target frame to be reconstructed;

concatenate the reference frame, the raw target frame and the reconstructed target frame to obtain a paired data, wherein the transformer-based discriminator is configured to model long-distance dependencies across the reference frame, the raw target frame and the reconstructed target frame;

determine whether the paired data is real or fake to guide reconstruction of the raw target frame, wherein the reconstruction of the raw target frame comprises encoding and decoding of target frames;

determine a generator loss and a transformer-based discriminator loss, and perform gradient back propagation and update network parameters of the GAN based on the generator loss and the transformer-based discriminator loss to obtain a trained GAN for the terminal; and compressing, by the trained GAN of the terminal, a video stream for communication, storage, or processing.

11. The apparatus for video compression of claim 10, wherein the one or more processors are further configured to:
  obtain the reference frame and the raw target frame to be reconstructed;
  obtain an estimated motion based on the reference frame and the raw target frame;
  encode the estimated motion to obtain an encoded motion, quantize the encoded motion into a quantized encoded motion, and convert the quantized encoded motion into a bit stream with entropy encoding;
  decode the bit stream with entropy decoding, dequantize and decode the bit stream to obtain a decoded motion, and warp the decoded motion with the reference frame to obtain a warped target frame; and
  concatenate the warped target frame, the reference frame and a reconstructed motion together as a tensor, and obtain a predicted targe frame by feeding the tensor into a motion compensation convolutional neural network.

12. The apparatus for video compression of claim 11, wherein the one or more processors are further configured to:
  subtract the predicted target frame from the raw target frame to obtain a residue;
  obtain an encoded residue by feeding the residue into the residue encoder network, quantize the encoded residue into a quantized encoded residue, and convert the quantized encoded residue into a residual bit stream with entropy encoding; and
  decode and dequantize the residual bit stream to obtain a reconstructed residue, and add the reconstructed residue to the predicted target frame to obtain a reconstructed target frame.

13. The apparatus for video compression of claim 10, wherein the one or more processors are further configured to:
  concatenate a quantized encoded motion and a quantized encoded residue together to feed into a Spatial Feature Extractor (SFE) to obtain an extracted feature, and concatenate the extracted feature and an estimated flow to form a condition; and
  concatenate the raw target frame, the raw reference frame and the condition as a true data, and concatenate the generated target frame, the generated reference frame and the condition as a fake data; and
  obtain the paired data comprising the true data and the fake data.

14. The apparatus for video compression of claim 10, wherein the one or more processors are further configured to:
  feed the paired data into a feature extraction convolutional neural network, and flatten the extract feature to obtain a flattened feature;
  obtain a transformed feature by feeding the flattened feature into a transformer block; and
  determine whether the transformed feature is real or fake by feeding the transformed feature into a multi-layer perceptron head and a sigmoid activation function.

15. The apparatus for video compression of claim 10, wherein the one or more processors are further configured to:
  determine the generator loss for reconstructing decoded frames by determining five terms, wherein the five terms comprise an adversarial loss term, a distortion loss term, a feature matching loss term, an entropy loss term, and a perceptual loss term; and
  determine the discriminator loss based on last-layer discriminator probability obtained from both a reconstructed target frame and a raw target frame.

16. A non-transitory computer-readable storage medium for storing computer-executable instructions that, when executed by a terminal having one or more computer processors, cause the one or more computer processors of the terminal to perform acts comprising:
  obtaining, by a generator of a generative adversarial network (GAN), a reconstructed target frame based on a reference frame and a raw target frame to be reconstructed;
  concatenating, by a transformer-based discriminator of the GAN, the reference frame, the raw target frame and the reconstructed target frame to obtain a paired data, wherein the transformer-based discriminator is configured to model long-distance dependencies across the reference frame, the raw target frame and the reconstructed target frame;
  determining, by the transformer-based discriminator of the GAN, whether the paired data is real or fake to guide reconstruction of the raw target frame, wherein the reconstruction of the raw target frame comprises encoding and decoding of target frames;
  determining a generator loss and a transformer-based discriminator loss, and performing gradient back propagation and updating network parameters of the GAN based on the generator loss and the transformer-based discriminator loss to obtain a trained GAN for the terminal; and
  compressing, by the trained GAN of the terminal, a video stream for communication, storage, or processing.

17. The non-transitory computer-readable storage medium for of claim 16, wherein obtaining the reconstructed target frame based on the reference frame and the raw target frame to be reconstructed further comprises:
  obtaining the reference frame and the raw target frame to be reconstructed;
  obtaining, by a motion estimation network of the generator, an estimated motion based on the reference frame and the raw target frame;
  encoding, by a motion encoder network of the generator, the estimated motion to obtain an encoded motion, quantizing the encoded motion into a quantized encoded motion, and converting the quantized encoded motion into a bit stream with entropy encoding;
  decoding, by a motion decoder network of the generator, the bit stream with entropy decoding, dequantizing and decoding the bit stream to obtain a decoded motion, and warping the decoded motion with the reference frame to obtain a warped target frame; and
  concatenating the warped target frame, the reference frame and a reconstructed motion together as a tensor, and obtaining a predicted targe frame by feeding the tensor into a motion compensation convolutional neural network.

18. The non-transitory computer-readable storage medium of claim 17, wherein the instructions cause the one or more processors to perform acts further comprising:
  subtracting the predicted target frame from the raw target frame to obtain a residue;
  obtaining, by a residue encoder network of the generator, an encoded residue by feeding the residue into the residue encoder network, quantizing the encoded residue into a quantized encoded residue, and converting the quantized encoded residue into a residual bit stream with entropy encoding; and decoding and dequantizing, by a residue decoder network of the generator, the residual bit stream to obtain a reconstructed residue, and adding the reconstructed residue to the predicted target frame to obtain a reconstructed target frame.

19. The non-transitory computer-readable storage medium of claim 16, wherein concatenating the reference frame, the raw target frame and the reconstructed target frame to obtain a paired data further comprises:
concatenating, by the transformer-based discriminator, a quantized encoded motion and a quantized encoded residue together to feed into a Spatial Feature Extractor (SFE) to obtain an extracted feature, and concatenating the extracted feature and an estimated flow to form a condition; and
concatenating the raw target frame, the raw reference frame and the condition as a true data, and concatenating the generated target frame, the generated reference frame and the condition as a fake data; and
obtaining the paired data comprising the true data and the fake data.

20. The non-transitory computer-readable storage medium of claim 16, wherein determining the generator loss and the transformer-based discriminator loss further comprises:
determining the generator loss for reconstructing decoded frames by determining five terms, wherein the five terms comprise an adversarial loss term, a distortion loss term, a feature matching loss term, an entropy loss term, and a perceptual loss term; and
determining the discriminator loss based on last-layer discriminator probability obtained from both a reconstructed target frame and a raw target frame.

* * * * *